(12) United States Patent
Green et al.

(10) Patent No.: US 8,129,196 B2
(45) Date of Patent: Mar. 6, 2012

(54) PARALLEL LOADING OF ARRAYS

(75) Inventors: Roland D Green, Madison, WI (US);
Mark McCormick, Madison, WI (US);
Gary Barrett, Madison, WI (US)

(73) Assignee: Roche Nimblegen, Inc., Wilmington, DE (US)

( * ) Notice: Subject to any disclaimer, the term of this patent is extended or adjusted under 35 U.S.C. 154(b) by 0 days.

(21) Appl. No.: 12/269,088

(22) Filed: Nov. 12, 2008

(65) Prior Publication Data
US 2009/0069197 A1 Mar. 12, 2009

Related U.S. Application Data

(62) Division of application No. 10/674,768, filed on Sep. 30, 2003, now Pat. No. 7,482,170.

(60) Provisional application No. 60/415,090, filed on Oct. 1, 2002, provisional application No. 60/415,118, filed on Sep. 30, 2002, now abandoned.

(51) Int. Cl.
*G01N 1/10* (2006.01)
(52) U.S. Cl. ........ 436/180; 436/174; 422/500; 422/501; 435/78; 73/863.31; 73/180
(58) Field of Classification Search .................. 436/174, 436/180; 422/99–100, 500–501; 435/6, 435/78; 73/863.31, 180
See application file for complete search history.

(56) References Cited

U.S. PATENT DOCUMENTS

| 4,895,706 | A | | 1/1990 | Root et al. |
| 5,141,719 | A | * | 8/1992 | Fernwood et al. ............. 422/534 |
| 5,143,854 | A | | 9/1992 | Pirrung et al. |
| 5,324,633 | A | | 6/1994 | Fodor et al. |
| 5,384,261 | A | | 1/1995 | Winkler et al. |
| 5,405,783 | A | | 4/1995 | Pirrung et al. |
| 5,545,531 | A | * | 8/1996 | Rava et al. ........................ 506/23 |
| 5,560,811 | A | * | 10/1996 | Briggs et al. ................... 204/451 |
| 5,677,195 | A | | 10/1997 | Winkler et al. |
| 5,858,194 | A | | 1/1999 | Bell et al. |
| 5,874,219 | A | | 2/1999 | Rava et al. |
| 6,027,880 | A | | 2/2000 | Cronin et al. |
| 6,040,138 | A | | 3/2000 | Lockhart et al. |
| 6,040,193 | A | | 3/2000 | Winkler et al. |
| 6,056,926 | A | | 5/2000 | Sugarman et al. |
| 6,083,763 | A | | 7/2000 | Balch |
| 6,143,496 | A | | 11/2000 | Brown et al. |
| 6,197,506 | B1 | | 3/2001 | Fodor et al. |
| 6,309,822 | B1 | | 10/2001 | Fodor et al. |
| 6,333,179 | B1 | | 12/2001 | Matsuzaki et al. |
| 6,342,355 | B1 | | 1/2002 | Hacia et al. |
| 6,346,413 | B1 | | 2/2002 | Fodor et al. |
| 6,358,686 | B1 | | 3/2002 | Lemieux et al. |
| 6,361,947 | B1 | | 3/2002 | Dong et al. |
| 6,368,799 | B1 | | 4/2002 | Chee |

(Continued)

FOREIGN PATENT DOCUMENTS

WO 02/48676 A3 6/2002

*Primary Examiner* — Jyoti Nagpaul
(74) *Attorney, Agent, or Firm* — Quarles & Brady LLP

(57) ABSTRACT

The present inventions provides an apparatus and method for the parallel loading of multiple samples in a microarray containing a plurality of sub-arrays. The method makes use of a microarray containing multiple sub-arrays, a loading channel array, and a fluid handling robot or an assembly robot or machine.

10 Claims, 5 Drawing Sheets

U.S. PATENT DOCUMENTS

| | | |
|---|---|---|
| 6,375,903 B1 | 4/2002 | Cerrina et al. |
| 6,379,895 B1 | 4/2002 | Fodor et al. |
| 6,484,183 B1 | 11/2002 | Balaban et al. |
| 6,489,146 B2 | 12/2002 | Stemmer et al. |
| 6,491,871 B1 | 12/2002 | Fodor et al. |
| 6,505,125 B1 | 1/2003 | Ho |
| 6,525,185 B1 | 2/2003 | Fan et al. |
| 6,682,702 B2 | 1/2004 | Barth et al. |
| 2003/0049862 A1* | 3/2003 | He et al. .................. 436/180 |

* cited by examiner

PARALLEL LOADING OF ARRAYS

The present application is a Divisional of, and thereby claims priority from, U.S. patent application Ser. No. 10/674,768 filed Sep. 30, 2003, which claims priority from U.S. Provisional patent application Ser. No. 60/415,118 filed Sep. 30, 2002 and U.S. Provisional patent application Ser. No. 60/415,090 filed Oct. 1, 2002, all of which are incorporated herein be reference in their entireties.

BACKGROUND OF THE INVENTION

The advent of DNA microarray technology makes it possible to build an array of hundreds of thousands of DNA sequences in a very small area, such as the size of a microscopic slide. See, e.g., U.S. Pat. Nos. 6,375,903 and 5,143,854, each of which is hereby incorporated by reference in its entirety. The disclosure of U.S. Pat. No. 6,375,903 enables the construction of so-called maskless array synthesizer (MAS) instruments in which light is used to direct synthesis of the DNA sequences, the light direction being performed using a digital micromirror device (DMD). Using an MAS instrument, the selection of DNA sequences to be constructed in the microarray is under software control so that individually customized arrays can be built to order. In general, MAS based DNA microarray synthesis technology allows for the parallel synthesis of over 800,000 unique oligonucleotides in a very small area of on a standard microscope slide. For many applications, the entirety of the synthesized array is devoted to the evaluation of one sample of test nucleotides. In these applications, the entire microarray area is enclosed in a small chamber so as to allow for the application of the single sample, thus providing a very efficient means for measuring the expression level of a very large number of genes within that one sample. A typical application of this sort is gene expression profiling.

The availability of microarrays is revolutionizing the way that researchers collect data about the expression of genes in cells and organisms. By proper selection of the sequence of probes, the profile of gene expression in a cell or tissue can be revealed. Since microarrays can have hundreds of thousands of features, each feature having a set of identical DNA probes, the microarray can by used to collect a massive amount of data in parallel. For example, DNA microarray technology has been applied to many areas such as gene expression and discovery, mutation detection, allelic and evolutionary sequence comparison, and genome mapping. For some applications, the amount of data gathering potential in a microarray is simply too much, since sometimes the data to be collected involves far fewer probes than a microarray's full capacity.

In applications, it is desired to study a smaller number of genes. In some of such applications it is desired to test a large number of samples against a smaller set of probes that the full capacity of the microarray makes available. To perform studies for these applications, the microarray can be logically divided into any number of smaller sub-arrays each having the same or similar nucleotide probes, a concept sometimes referred to as an array of arrays. Instead of a single microarray, for example, with 100,000 features or probe areas, the microarray can be divided into 1000 sub-arrays, each of 100 features. To use an array of arrays efficiently, multiple samples are hybridized in parallel, in a single experiment, with each sample being hybridized to a given and predetermined area of the microarray, an area making up one of the sub-arrays in the array of arrays. This parallel loading strategy provides for efficient utilization of the high synthesis capacity of the microarray. In order to load multiple samples onto a microarray made up of sub-arrays, while avoiding sample cross-contamination, some mechanism must be provided to prevent leakage of each sample to adjacent sub-arrays. Currently, microarrays built for this purpose (e.g., U.S. Pat. No. 5,874,219) use physical wells to separate probe sets for different samples. This approach may not be optimal for array of array microarrays having a large number of sub-arrays, where alignment of physical wells with the sub-arrays could be challenging.

Another of the technical challenges arising from the use of sub-arrays is the delivery and control of sample volumes delivered to each of the small sub-arrays. It is envisioned that sample volumes may fall as low as 200 nl per sample with sub-arrays. When sample sizes are this small, evaporation of liquids and delivery of samples both become serious problems. This invention describes a method and apparatus to overcome the problems of sample delivery to the sub-arrays, and provides for a methodology to conduct hybridization reactions in small volumes on the arrays of arrays.

BRIEF SUMMARY OF THE INVENTION

The present inventions is summarized as an apparatus and method for the parallel loading of multiple samples in a microarray containing a plurality of sub-arrays. The method makes use of a microarray containing multiple sub-arrays, a loading channel array, and a fluid handling robot or an assembly robot or machine.

The method is practiced in one embodiment by providing a sample loading array having a plurality of micro-channels, each channel having a longitudinal axis passing through its center and defining the center of the channel, and by providing a microarray having a plurality of sub-arrays, each sub-array having an axis passing perpendicular through its center and defining the center of the sub-array. A dialysis membrane is placed in contact with one side of the channel array to close the micro-channels and allow for the selective passing of liquids and molecules through the membrane and through the micro-channels. Once combined, samples are deposited in the micro-channel through the end opposite of the membrane using a delivery system capable of simultaneous delivery of samples to multiple sites. The membrane and channel array combination are then placed in a water or buffer solution, with only the membrane side of the sample loading array contacting the water or buffer, until equilibrium is achieved. After the samples have had a chance to come into equilibrium, the channel array and microarray are combined with a gasket so as to provide a hybridization chamber, wherein the center of the channels are aligned with the center of the sub-arrays. Once the hybridization chamber is formed, the samples in each individual micro-channel are placed in contact with the corresponding sub-array using either centrifugal force or pressure, such as a vacuum.

Other embodiments of the present invention use different versions of the sample loading array. In each instance, the sample loading array is pre-loaded with samples and place in contact with the microarray with the samples aligned with the sub-arrays of the microarray. Different versions of the sample loading array become more advantageous depending on the number and size of the sub-arrays.

The present invention provides several advantages. First, the invention provides for the parallel processing of large numbers of samples. It also allows for the accurate delivery of small sample volumes, the elimination of evaporation as a problem, and is relatively simple and a low cost.

Other objects, features and advantages of the present invention will become apparent from the following description taken together with the accompanying drawings.

DETAILED DESCRIPTION OF THE INVENTION

Figure 1:
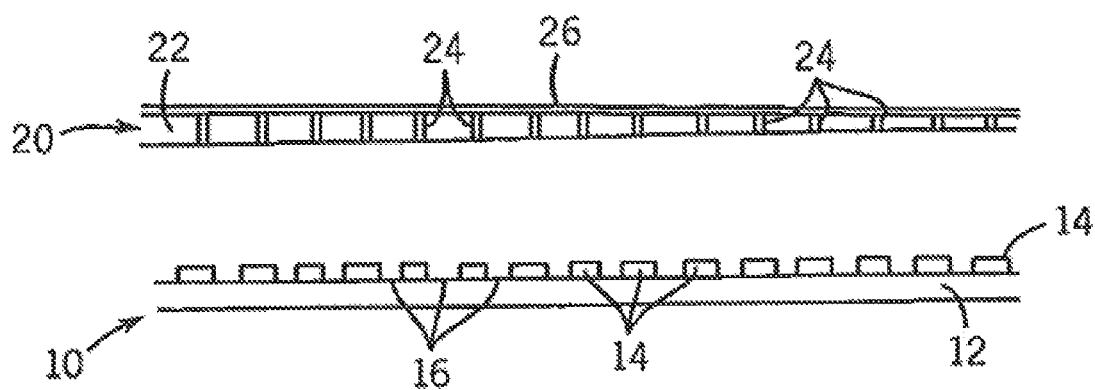
FIG. 1 is a side sectional view of one embodiment of a sample loading array according to the present invention.

The present invention provides an apparatus and method for the parallel loading of multiple samples in a microarray containing a plurality of sub-arrays. The idea utilizes a sample loading array into which the samples can be deposited. The sample loading array is then placed in contact with the microarray so that the samples are delivered to the appropriate sub-arrays. The hybridization reactions can then be conducted in a sort of sandwich, with the reaction area for each reaction being defined between the microarray substrate and the carrier for the sample loading array.

Here is it contemplated that the microarray is made on a planar support, typically a glass microscope slide. The microarray is subdivided into many features, a feature being a physical area on the slide in which all of the single stranded DNA probes are intended to have the a common sequence or sequences. The microarray for the purposes of this invention is one that includes an array of arrays. In other words, a set of features are repeated two or more times across the microarray. The set of features that is repeated is here often referred to as sub-arrays. While it is typical that the sub-arrays are all identical, that is not required. Sub-arrays are areas within a microarray that contain a set of features which, when taken together, contain all the probes of interest intended to be tested in a single hybridization with a common experimental sample. In general, sub-arrays may vary in size depending upon the number of features included in each sub-array, i.e. if there are more features in each sub-array, then less sub-arrays can be fit into the microarray. A sub-array may also contain blank positions (a position available for a feature with probes, but is left with no probe) and any number of control features. For the purpose of the present invention, the shape of each sub-array does not matter.

It is preferred, but not required, that the sub-arrays are separated from each other by barriers, such as by a hydrophobic barrier defining boundaries about each sub-array. Such a boundary serves to inhibit fluid communication between each sub-array during hybridization to help ensure that the hybridization reaction in one sub-array does not interfere with that in another. In one embodiment, the hydrophobic barrier is prepared using a microarray synthesis instrument itself which deposits trityl protected or other hydrophobic group-bearing phosphoramidites. It is anticipated, however, that other compounds or molecules may also be used as the hydrophobic barrier.

In practice, the preparation of the hydrophobic barrier is a slight variation on the normal microarray synthesis process. While the normal method of microarray synthesis is initiated by the synthesis of a short DNA-based linker sequence over the entirety of the available array surface, the current invention separates array areas into two basic types: barrier areas and sub-array areas.

To build the hydrophobic barrier areas, the activated substrate in the barrier areas is coupled with a hydrophobic group-bearing phosphoramidites, such as trityl-protected phosphoramidite. In the preferred embodiment, this step is performed following the synthesis of the DNA probes using NPPOC-protected phosphoramidite chemistry. The result is a grid of subarrays where every element in the grid is bordered by areas of the substrate to which no nucleotides have yet been added. These barrier or border areas can be the locations that could be used as features if the full capacity of the microarray was utilized, but these locations are reserved here for barriers between sub-arrays. Then the barrier or border areas are de-protected and hydrophobic group-bearing phosphoramidites are exposed to the array. The hydrophobic groups are thus added to the barrier areas of the microarray to separate the sub-arrays by hydrophobic areas.

To load samples in parallel, a sample loading array is needed. One embodiment of the sample loading array a planar member, such as a glass sheet or slide, similar to the microarray substrate, which includes a plurality of micro-channels formed extending through the member, the channels having centers that correspond to the centers of the sub-arrays. For every sub-array, there is at least one channel in the sample loading array. The glass surface of the sample loading array that faces the microarray can be treated so that the surface area between the channels on the sample loading array is also hydrophobic. On the surface of the sample loading array away from the microarray, the surface of the micro-channels are sealed by a membrane, such as a dialysis membrane, attached to that face of the sample loading array. The membrane will allow water to pass through it, but is sized so that biological molecules like nucleic acids cannot. The membrane can be formed of any porous sheet material that would allow low molecular weight molecules to pass through, such as salts and water, but would exclude nucleic acids. The other end of each channel, on the face to be applied to the microarray, is left open.

This concept is illustrated in FIG. 1. The microarray is indicated at 10, and is formed on a substrate 12. The microarray includes sub-arrays indicated at 14 and areas between the sub-arrays, preferable rendered hydrophobic, indicated at 16. The sample loading array is indicated at 20 and includes a planar member 22 into which the channels 24 are formed, one channel for each sub-array on the microarray 12. A planar microporous membrane 26 is placed on the back surface of the sample loading array 20.

Samples are spotted into the micro-channels in the sample loading array 20, using a fluid handling robot, from the face that will be applied to the microarray, i.e. the face away from the membrane 26. In the preferred embodiment, one capillary and/or micro-channel, and reservoir is used per sub-array. A robot designed for manufacturing spotted arrays works well for the application. At this stage evaporation is not a problem and the samples can be allowed to evaporate without harm, because the samples will be re-hydrated before the hybridization. Alternatively, the sample loading array could already be in contact with water or a buffer through the membrane bound side of the sample loading array. This would prevent drying down of the samples and would maintain the proper state of hydration state for the sample. For molecules which are sensitive to their state of hydration, this form of continuous hydration may be preferred.

After all the samples are delivered into the sample loading array, the sample array can be stored until the hybridization is to be performed. Then, the side of the channel array with the membrane 26 can be placed in water or a buffer solution or water or buffer is applied to the membrane 26, which will permit water to wick into the micro-channels to re-hydrate the samples. After the samples have had a chance to come into equilibrium, the sample array 26 is placed on the microarray 10 with the open ends of the channels facing the sub-arrays. A gasket is placed between the microarray and channel array to prevent the samples in the sub-arrays from evaporating at this point. In the preferred embodiment, the gasket is dual sided and semi-adhesive. After loading samples, the hybridization reaction is allowed to occur. Fluid pressure can be applied to the membrane 26 if force is necessary to move the sample material out of the sample array into contact with the microarray.

Another alternative is simple to place the sample array on the microarray with the sample array dry. Then liquid, such as buffer, can be placed on the membrane on the back side of the sample array to re-hydrate the samples to that they will contact the probes on the subarrays.

Figure 2:
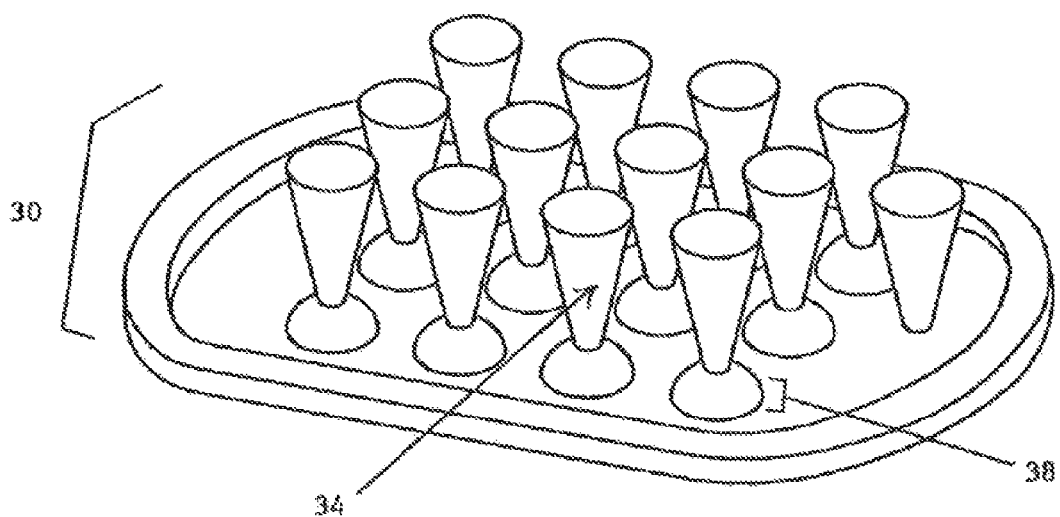
FIG. 2 is a drawing illustrating a topical view of a channel array with gasket and capable of accommodating 12 sub-arrays.
Figure 3:
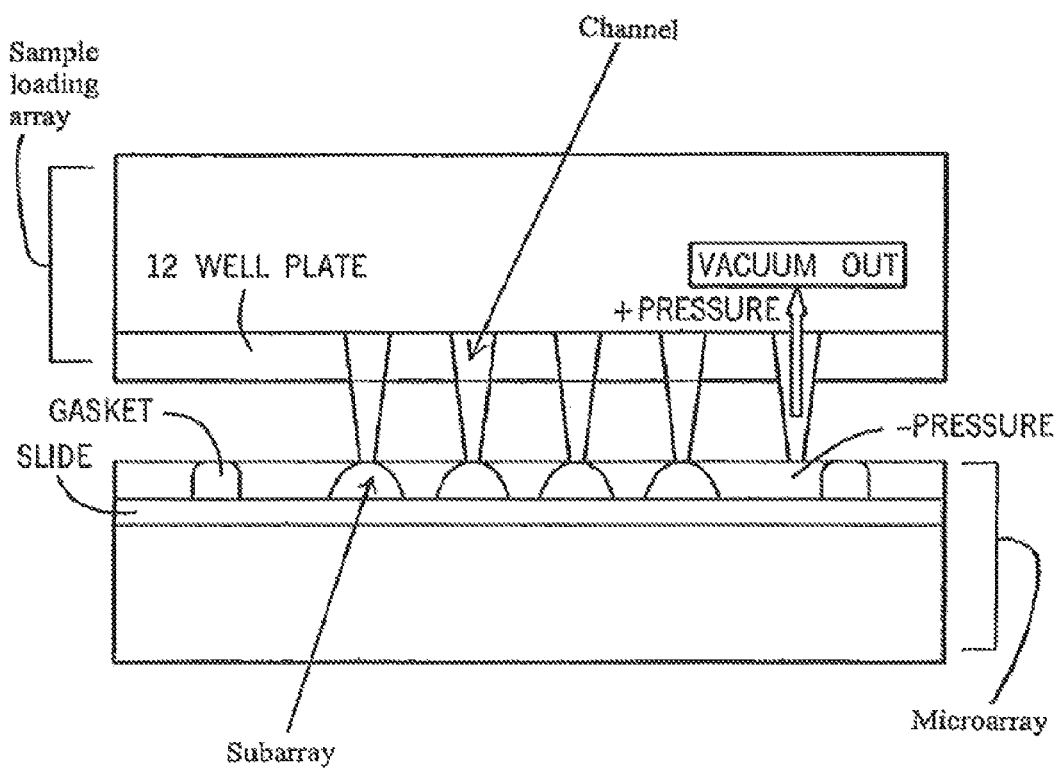
FIG. 3 is a side view drawing illustrating a microarray having 12 sub-arrays and with sample being added by way of a channel array.

In an alternative embodiment, suction can be used to deliver samples to the microarray in parallel. This embodiment, intended for use on a slightly larger scale, makes use of the sample loading array illustrate in FIG. 2. In this embodiment, the sample loading array is indicated at 30, and the channels at 34. The channels 34 open into spherical chambers 38 located on the front face of the sample loading array member. To use this embodiment, the samples are loaded into the channels in aqueous solution. The sample loading array is then placed against the microarray, as indicated in FIG. 3, with a gasket between the sample loading array and the microarray. A partial vacuum is drawn into the area between the microarray and the sample loading array to draw the samples into contact with the microarray. The hydrophobic areas again preferably keep the fluids contained in the sub-arrays. In addition, the membrane sealed end of the channel array may be sealed to prevent evaporation out of this end, or remain in contact with a reservoir of water or buffer to replace any volume lost through evaporation.

Once the microarray is aligned into place, a small vacuum can be drawn out through the vacuum slot. The vacuum will be required to displace the sample in all capillaries, filling each of the designated sub-arrays on the slide. As the sub-array fills, the sample must be contained within appropriate hydrophobic regions and arrive at a state of equilibrium with the inner chamber pressure. This is necessary so that each sample from the reservoirs and capillaries creates equal contact time and angles with all sub-arrays without spilling over the hydrophobic regions. It is desirable to minimize spilling into adjacent hydrophobic regions to preserve each sample's integrity, and prevent cross-contamination.

The same effect can be accomplished by pressurizing the side of the sample array having the porous membrane. If that side is pressurized, buffer is forced into the micro-channels to carry the samples out into contact with the probes in the sub-arrays. Other alternative to force the samples down the micro-channels would be centrifugal force from spinning the assembly or even gravity.

Figure 4:
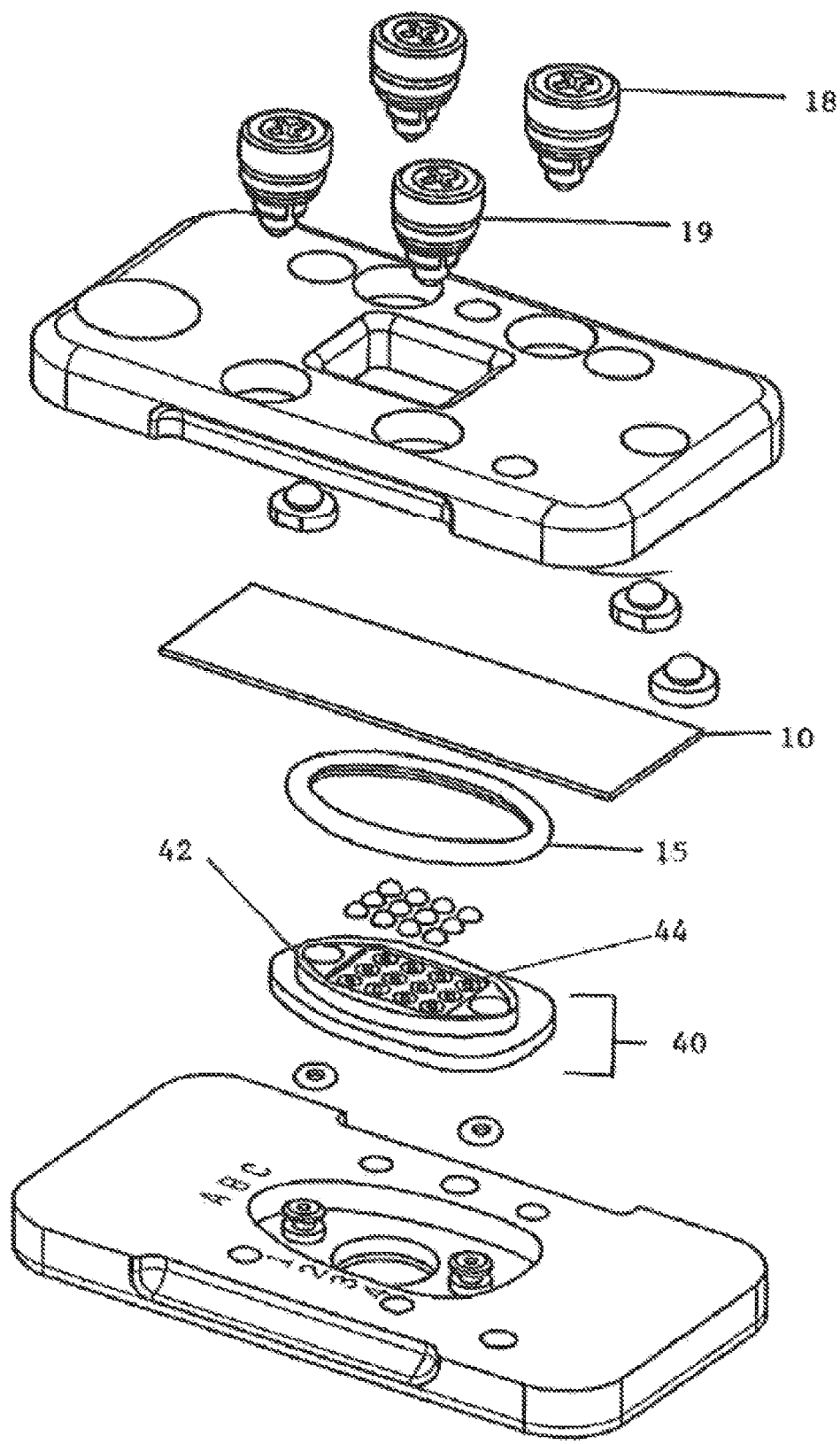
FIG. 4 is an exploded perspective view of another embodiment of a sample loading array.

Another embodiment here is intended for use again with larger volumes, which is mainly intended for use with microarrays having a smaller number of larger sub-arrays. In the embodiment illustrated in FIG. 4, there are twelve sub-arrays and twelve compartments in the sample loading array.

The sample loading array 40 is formed as a plate 42 with wells 44 formed in it. The microarray is indicated again at 10. This embodiment also uses clamping members 18 and 19, as well as a gasket, here indicated at 15. The samples are placed in the wells 44, and the sample loading plate is placed against the microarray 10 with the gasket 15 interposed. The clamping members 18 and 19 are used to seal the two together. One of the clamping blocks, the lower one viewed in FIG. 4, has liquid ports formed in it so that the area between the microarray and the sample can be washed after hybridization. Note that the top clamping member has a window formed in it so that the microarray can be read optically after the hybridization is performed. Physical interlocks between the clamping members 18 and 19 prevent the assembly from being put together in the wrong way.

Figure 5:
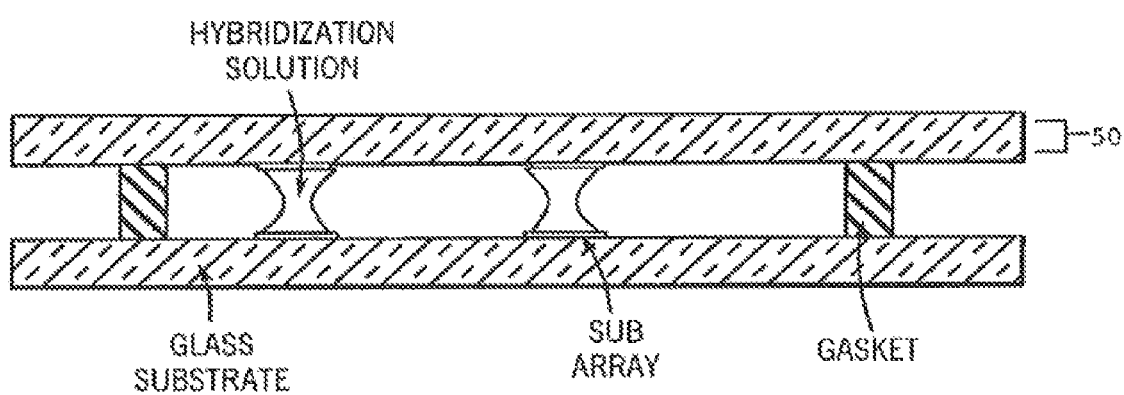
FIG. 5 is a side sectional view showing the arrangement of parts in another embodiment of the present invention.

Another embodiment is illustrated in FIG. 5, this one intended for a microarray with many smaller sub-arrays. In this embodiment, the sample loading array is a simple planar member, indicated at 50 in FIG. 5. In this embodiment, a gasket 15 is used. This version requires that the amount of fluid in each sample be well controlled and that measures be taken to prevent drying of the samples. This embodiment preferable uses hydrophobic barriers on both the microarray, between sub-arrays, and on the sample loading array, between sample areas. In essence, the samples in this embodiment sit as drops on the surface of the sample loading array. The sample loading array is placed closely against the microarray, and the droplet of the sample bridges the gap between the sample loading array and the microarray. The hybridization takes place in the fluid confined between the two planar surfaces and between the hydrophobic areas on the two arrays. After hybridization, the microarray can be washed as normal before reading the results.

The invention claimed is:

1. A microarray hybridization chamber for parallel loading of samples comprising:
    a sample loading array comprising a plurality of micro-channels having a first open end on a first side of the micro-channel array and a second open end on a second side of the micro-channel array, said first end and second end defining a channel in fluid communication with the first side of the micro-channel array and the second side of the channel area, each channel having a longitudinal axis passing through its center and defining the center of the channel;
    a microarray comprising a plurality of sub-arrays; the microarray and the loading array being adapted to define a hybridization chamber wherein each of the plurality of sub-arrays comprises multiple features;
    a membrane in contact with the second side of the micro-channel array to close the second end of the micro-channels and to allow for the selective passing of liquids and molecules through the membrane and through the micro-channels; and
    a gasket, placed between the first side of the micro-channel array and the microarray so as to provide a hybridization chamber, the center of each channel aligned with the center of each sub-array, the first open ends of the micro-channels facing the sub-arrays of the microarray.

2. The chamber of claim 1 wherein the gasket is dual sided and semi-adhesive.

3. The chamber of claim 1 wherein the sub-arrays are divided by a hydrophobic barrier.

4. The chamber of claim 3 wherein the hydrophobic barrier comprises a hydrophobic group-bearing phosphoramidite.

5. The chamber of claim 4 wherein the hydrophobic group-bearing phosphoramidite is trityl protected phosphoramidite.

6. A method for simultaneously hybridizing a microarray having multiple sub-arrays, the method comprising the steps of:

provixmling a first microarray which includes a plurality of sub-arrays;

depositing a sample for each sub-array on a planar sample loading array spaced apart from the microarray, wherein the sample loading array comprises a plurality of micro-channels having a first open end;

placing against the microarray a gasket to encompass the sub-arrays containing the sample; and placing in contact with the gasket the sample loading array with the first open ends of the micro-channels facing the sub-arrays and with each sample aligned with one of the sub-arrays as to provide a sandwich hybridization chamber.

7. The method of claim 6 wherein the sub-arrays are divided by a hydrophobic barrier.

8. The method of claim 7 wherein the hydrophobic barrier is formed by a hydrophobic group-bearing phosphoramidite bound to the substrate.

9. The method of claim 6 wherein the sample is deposited into a plurality of subarrays using a delivery system capable of simultaneous delivery of samples to multiple sites.

10. The method of claim 6 wherein the delivery system is either a bundle of capillary tubes, a fluid handling robot, or a robot designed for manufacturing spotted arrays.

\* \* \* \* \*